United States Patent [19]

Pangburn et al.

[11] Patent Number: 4,961,654
[45] Date of Patent: Oct. 9, 1990

[54] BEARING ASSEMBLY

[75] Inventors: Daniel W. Pangburn, Fullerton; Gregg A. Cole, Chino, both of Calif.

[73] Assignee: Aerojet-General Corporation, Folsom, Calif.

[21] Appl. No.: 335,467

[22] Filed: Apr. 10, 1989

[51] Int. Cl.⁵ ............................................. F16C 19/52
[52] U.S. Cl. ..................................... 384/517; 384/542
[58] Field of Search ............... 384/512, 515, 517, 518, 384/519, 542

[56] References Cited

U.S. PATENT DOCUMENTS

| | | | |
|---|---|---|---|
| 1,923,777 | 8/1933 | Delaval-Crow | 384/518 |
| 2,068,594 | 1/1937 | Buhr | 384/518 |
| 2,387,105 | 10/1945 | Yager | 384/518 |
| 3,056,636 | 10/1962 | Mims | 384/517 |
| 3,516,717 | 6/1970 | Peterson | 384/517 |
| 3,578,829 | 5/1971 | Hata | 384/518 X |
| 3,738,719 | 6/1973 | Langner | 384/517 |
| 4,173,376 | 11/1979 | Standing et al. | 384/517 |
| 4,569,602 | 2/1986 | Lundgren | 384/517 |
| 4,699,528 | 10/1987 | Gotman | 384/518 |

Primary Examiner—Thomas R. Hannon
Attorney, Agent, or Firm—Leonard Tachner

[57] ABSTRACT

A bearing and bearing load maintaining device which provides the stiffness of a duplex set, that is, a hard preload when new, but which maintains the required internal load over an extended life to preserve alignment precision in spite of wear or differential thermal expansion. The latter is provided by a compliant spring preload configuration which takes effect only after the bearing begins to wear or otherwise unloads due to differential thermal expansion. In one embodiment, the present invention comprises a flanged bearing which applies a hard preload against an outer sleeve which in turn abuts a more conventional bearing. The outer sleeve is provided with at least one recess or shoulder at an end face. The bearing set is assembled with a spring such as a wave spring positioned in the recess or annular space at one end face of the outer sleeve. When the internal load becomes equal to the axial force developed by the spring, the force in the spring causes the outer bearing race to separate from the outer sleeve and the bearing set internal load is maintained by the spring.

15 Claims, 3 Drawing Sheets

BEARING ASSEMBLY

BACKGROUND OF THE INVENTION

1. Field of the Invention

The present invention relates generally to bearings, and more specifically to a bearing load maintainer, primarily for use in spacecraft applications for maintaining a hard preload during launching operations and for thereafter upon bearing wear, maintaining a preselected minimum spring-biased soft preload.

2. Prior Art

Ball bearings in spacecraft applications are normally used in pairs and are preloaded axially toward each other to remove the play or looseness in them. Besides providing some rigidity to the shaft on which the bearings are mounted, the preload on the bearings minimizes the sliding of the balls in the raceway ball grooves. The sliding of the balls is detrimental to the lubrication system and the life of the bearings. However, an excessively large preload also tends to reduce the useful life of solid film lubricated bearings, as well as liquid or grease lubricated ones if their operation is in the boundary regime where ball-to-race contact is made.

Many designs of spacecraft mechanisms specify high axial preloads to prevent one or more of the bearings from becoming unloaded during launch vibration. It is believed by some designers that such unloading might cause impacts within the bearings that would result in the formation of ball brinell impressions that would then result in jittery operation and possibly reduced bearing life. Once the hardware is in the zero G environment of earth orbit, the high preloads are no longer useful and in fact are detrimental. Therefore, the axial preload on the bearings should be kept to the minimum that is necessary to remove the axial play. Generally speaking, there are two types of axial preloads. There is a hard preload applied by means of nuts, bolts or screws which force the ground bearing races against each other or against precision ground separation spacers. There is also a soft preload applied by compliant members such as springs which apply an axial load depending upon the spring rate and the displacement of the compliant members.

All prior art known to the applicant falls into one of the two aforementioned categories, namely hard preloaded bearings or soft preloaded bearings. Consequently, there is an inherent disadvantage in the use of prior art bearing configurations for space applications. More specifically, hard preloaded bearings are suitable for the rocket launch portion of a spacecraft maneuver because the hard preload withstands the high vibration load normally incurred during launch. Unfortunately however, during earth orbiting over many years, hard preloads as previously noted tend to reduce the useful life of ball bearings. More specifically, when the preload effect is lost due to wear and or differential thermal expansion, this results in loss of shaft alignment precision which can result in premature mechanical failures. On the other hand, while soft preload bearing configurations are preferred to maintain accurate alignment of rotating assemblies during years of a spacecraft orbit life, spring loaded bearings sets are readily damaged by chatter during launch if the preload magnitude is low or they exhibit high wear and fatigue if the preload magnitude is high.

There is therefore, an existing need for a bearing load maintainer which provides the stiffness of a duplex set, that is, a hard preload set when new, thereby avoiding damage from chatter such as during rocket launch and which also provides the compliance of a spring loaded set as the bearing wears or unloads due to differential thermal expansion thereby preserving the alignment precision of the bearing set. The applicant knows of no prior art which solves the aforementioned long felt need by providing such dual load bearing capabilities. More specifically, the following prior art is deemed to be the most relevant presently known to the applicant.

U.S. Pat. No. 4,699,528 is directed to a rather standard prior art rotary assembly having a self-positioning bearing. Axial supports consist of the snap-ring at one end of the ball bearing and the combination of a snap-ring and spring at the other end. The overall effect is to resiliently urge the inner ring and outer ring axially toward each other. Axial play of the balls between the two raceways is thus obviated regardless of the temperature/wear factors.

U.S. Pat. No. 4,173,376 is directed to bearing assemblies where bearing pre-loads are exerted by both high/low rate non-linear springs in tandem. At opposing ends of a shaft are main spring washers and soft spring washers. Main spring washers are formed of a high rate spring constant and soft spring washers are of a low rate spring constant. The spring washers are loaded axially inward toward each other to some predetermined preload by means of a nut. The resulting load is applied to the inner races of bearings through the thrust members.

U.S. Pat. No. 2,068,594 is directed to bearing structures for rotatable spindles. Pre-loading of the bearing is provided by insertion of a stiff spring over the threaded end of the spindle into abutting relation with the inner race of the upper bearing. The degree of pre-loading is determined by the manipulation of a nut which may be held against rotation relative to the spindle following adjustment.

U.S. Pat. No. 3,578,829 is directed to what is termed a bottom bracket for a bicycle. A ring-like spacer is in pressure contact with one end of the coil spring. The spacer is positioned inwardly of the second ball bearing race which is a left side bearing slideably mounted on the peripheral surface of the crank shaft. The ball bearing race is in sliding contact with the shaft and has a ring-like configuration with an inwardly depressed or concave annular steel ball bearing surface. The adjusting cap is threadedly fitted into the screw head on one end of the bracket lug.

SUMMARY OF THE INVENTION

The present invention solves the aforementioned long felt need by providing a bearing and bearing load maintaining device which provides the stiffness of a duplex set, that is, a hard preload when new, but which maintains the required internal load over an extended life to preserve alignment precision in spite of wear or differential thermal expansion. The latter is provided by a compliant spring preload configuration which takes effect only after the bearing begins to wear or otherwise unloads due to differential thermal expansion. In one embodiment, the present invention comprises a flanged bearing which applies a hard preload against an outer sleeve which in turn abuts a more conventional bearing. The outer sleeve is provided with at least one recess or shoulder at an end face and a spring is housed in this recess or annular space created by the shoulder. The bearing initial internal load or preload is obtained in a conventional manner for a duplex set, that is, the bearing is loaded to the desired preload and then the faces of the inner and outer bearing races are ground to a common plane. The axial position of the shaft and bearing assembly is established by the flange on the outer bearing race which flange is clamped to the housing by a bearing retainer. The bearing set is assembled with a spring such as a wave spring positioned in the recess or annular space at one end face of the outer sleeve. When a bearing nut is tightened, the outer bearing race bottoms against the outer sleeve so that the force developed by the spring does not influence the preload. As the bearing wears, the internal load decreases. When the internal load becomes equal to the axial force developed by the spring, the force in the spring causes the outer bearing race to separate from the outer sleeve and the bearing set internal load is maintained by the spring. The spring is preferably designed to have a low spring rate at the required force so that substantial bearing wear or differential thermal expansion can be accommodated with only a small further reduction in internal load.

Three alternative embodiments are disclosed. Two of these are essentially identical, but utilize bearing race configurations which obviate the requirement for flanged outer bearing race. The third alternate embodiment concerns the location of the spring in the outer sleeve and is equally suitable for use with any of the bearing configurations. In this third alternate embodiment the outer sleeve is replace by two shorter sleeves. The spring is positioned in a recess between adjacent ends of the two sleeves. This allows the use of a wider spring since it is not constrained by the width of the end of the outer bearing race. Initial preload causes the two outer sleeves to contact solidly at their interface. With bearing wear or thermal expansion, the spring pushes the two outer sleeves apart maintaining bearing preload at a necessary magnitude. The present invention thus provides a unique dual preload capability which is especially useful for spacecraft applications. One such preload condition is a predetermined hard preload which enables the bearing to withstand the rigors of spacecraft launch and the other such preload configuration is a soft preload which provides a preselected minimum internal load force after a predefined amount of wear or differential thermal expansion which assures long life shaft alignment precision during orbiting of the spacecraft.

OBJECTS OF THE INVENTION

It is therefore a principal object of the present invention to provide a bearing load maintaining device which provides a maximum hard preload when the bearing is new and a minimum soft preload after a limited degree of wear or differential thermal expansion.

It is an additional object of the present invention to provide a bearing load maintaining device that is especially useful in spacecraft applications wherein a hard bearing preload is provided during spacecraft launch and wherein subsequent to launch and a minimum degree of wear or differential thermal expansion, a preselected minimum preload is maintained during the orbit life of the spacecraft.

It is still an additional object of the present invention to provide a bearing load maintaining device of the type utilizing a spring or other compliant member for establishing a minimum preload, the spring effect being initially overcome by a hard preload configuration so that the preload established by the spring does not come into effect until after a minimum degree of wear or differential thermal expansion.

BRIEF DESCRIPTION OF THE DRAWINGS

The aforementioned objects and advantages of the present invention as well as additional objects and advantages thereof will be more clearly understood hereinafter as a result of a detailed description of preferred embodiments of the invention when taken in conjunction with the following drawings in which.

DETAILED DESCRIPTION OF PREFERRED EMBODIMENTS

Figure 1:
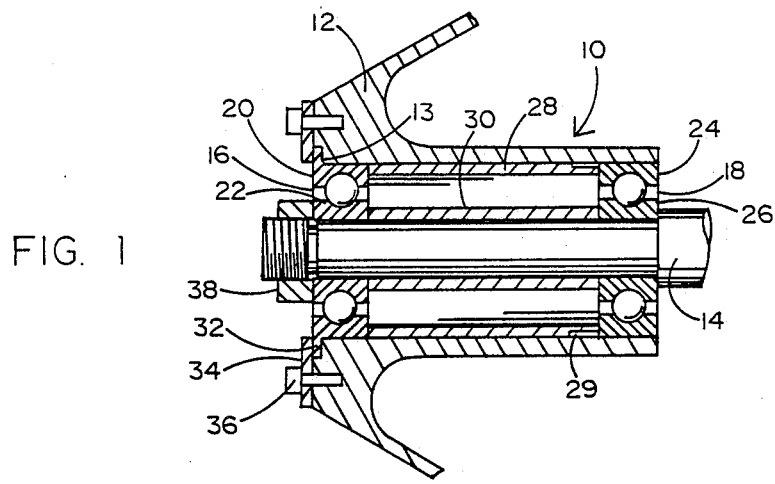
FIG. 1 is a cross-sectional view of a first embodiment of the invention.

Referring first to FIG. 1, it will be seen that a bearing set 10 in accordance with a first embodiment of the present invention comprises a housing 12 through which there is positioned a shaft 14 for rotational alignment by a first bearing 16 and a second bearing 18. First bearing 16 comprises an outer race 20 and an inner race 22 and second bearing 18 comprises an outer race 24 and an inner race 26. The first and second bearings are separated by a pair of sleeves, namely outer sleeve 28 and inner sleeve 30 which are of cylindrical configuration. The end of outer sleeve 28 adjacent second bearing 18 is provided with an annular recess 29 in which there is positioned a wave spring 25 seen in FIGS. 4 and 5. Wave spring 25 is preferably installed into the annular recess 29 so that the center of the spring coincides with the axis of shaft 14.

In the embodiment illustrated in FIG. 1, the outer race 20 of first bearing 16 is provided with an annular flange 32 which is received in a corresponding annular recess 13 in housing 12. The axial position of the shaft 14 and bearing set 10 is established by flange 32 on the outer bearing race 20 of first bearing 16 by virtue of the flange being clamped to the housing 12 by a bearing retainer 34 which is, in turn, fastened to the housing by at least one bolt 36.

The bore of the housing 12 is sized so that the outer race 24 of second bearing 18 is engaged in a close fit, but can still slide freely in the axial direction. The bearing initial internal load or preload, is obtained in the conventional manner for a duplex set, that is, the bearing is loaded to the desired preload and then the faces of the inner bearing races 22 and 26 and outer bearing 20 and 24 are ground to a common plane. The inner sleeve 30 and outer sleeve 28 are also ground to the same length. The bearing set is assembled with the wave spring positioned in the recess or annular space 29 at one end of the outer sleeve. Then the bearing nut 38 is tightened until the inner races 22 and 26 bottom against the inner sleeve 30 and the outer races 20 and 24 bottom against the outer sleeve 28 and the desired initial preload of the bearing is achieved. As the bearing nut 38 is tightened the outer bearing race 24 bottoms against the outer sleeve 28 so that the force developed by spring 25 does not influence the preload. As the bearing wears, the internal load decreases. When the internal load becomes equal to the axial force developed by the spring 25, the force in the spring causes the outer bearing race 24 to separate from the outer sleeve 28 and the bearing sets' internal load is maintained by the spring. Wave spring 25 is designed to have a low spring rate at the required force so that substantial bearing wear or differential thermal expansion can be accommodated with only a small further reduction in internal load.

It will be understood that the precise configuration of the wave spring 25 is not to be considered limiting of the present invention. More specifically, the present invention may be implemented by using other compliant member configurations which are capable of providing an axial force between the outer sleeve 28 and the outer bearing race 24 upon sufficient bearing wear. It will be also understood that the position of the spring and the number of springs may be readily altered in implementing the present invention. By way of example, a second recess similar to recess 29 may be provided at the end of outer sleeve 28 adjacent first bearing 16 and a second spring located in that second recess. As a second example, the outer sleeve can be constructed as two or more axially disposed cylinders and the springs located in a recess at the interface of these cylinders.

Figure 2:
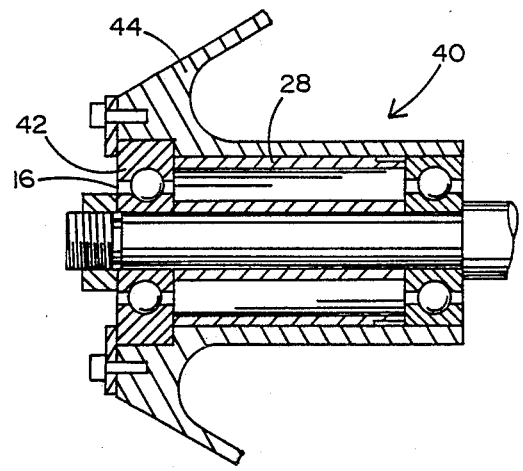
FIG. 2 is a cross-sectional view of a second embodiment of the invention.

FIG. 2 illustrates a bearing set 40 in accordance with a second embodiment of the present invention. Second embodiment 40 is identical to first embodiment 10 of FIG. 1 in all respects except that the outer race 42 of the first bearing 16 is modified along with a modification to the housing 44 to accommodate the reconfiguration of the outer bearing race. More specifically, by providing a bearing with a larger outer race outer diameter in place of the flange 32 of FIG. 1, the axial position of the shaft and bearing set may be established without the use of a flange.

Figure 3:
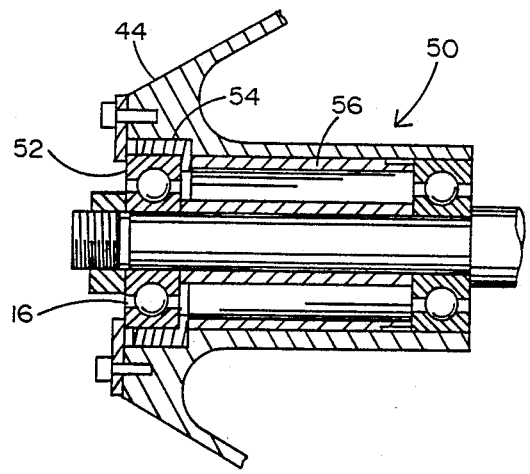
FIG. 3 is a cross-sectional view of a third embodiment of the invention.

FIG. 3 illustrates still an additional bearing set 50 in accordance with a third embodiment of the present invention. This embodiment is also virtually identical to that of FIG. 1 except that the enlarged outer race 42 of FIG. 2 has been replaced by a standard outer race 52 and a step sleeve 54. This third embodiment also obviates the flange 32 of the embodiment of FIG. 1, but does so in a manner which permits the use of standard size outer races. However, in this configuration, the outer sleeve 28 of FIGS. 1 and 2 must be replaced by a shorter outer sleeve 56 in order to accommodate the step sleeve 54.

Figure 4:
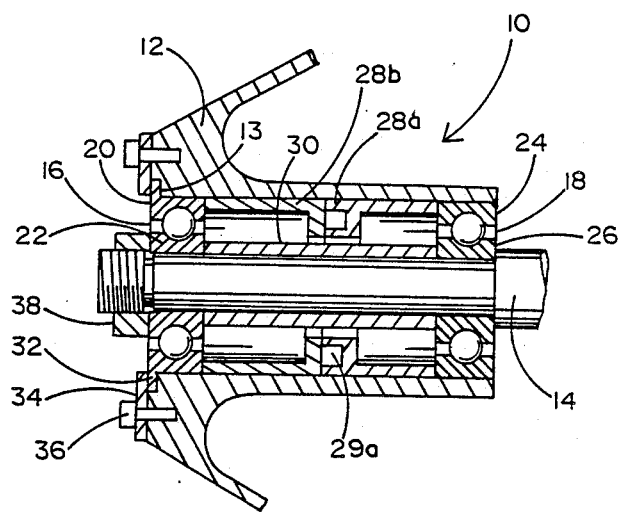
FIG. 4 is a cross-sectional view of a fourth embodiment of the invention.
Figure 5:
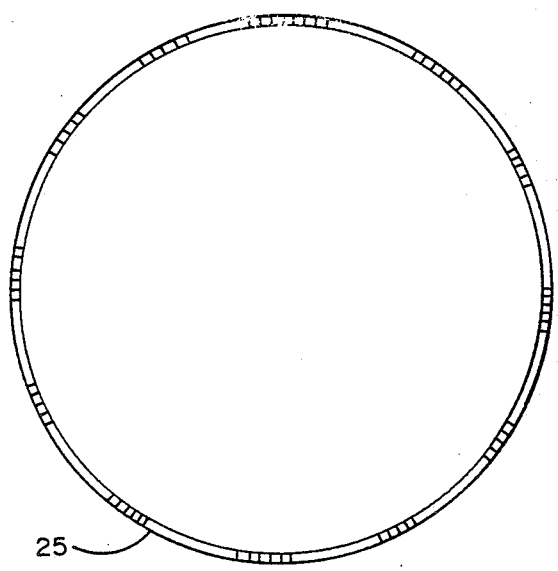
FIG. 5 is a front view of a wave spring of the type which may be used in the present invention.
Figure 6:
FIG. 6 is a side view of the spring of FIG. 5.

FIG. 4 shows an alternate location of the spring. The outer sleeve is in two parts 28a and 28b, and the spring is positioned in a shoulder or an annular recess 29a in the end of at least one of the outer sleeve parts. It will now be understood that what has been disclosed herein comprises a novel bearing set that provides the stiffness of a duplex set or hard preload when new, but which maintains the required internal load at a predetermined minimum level over an extended life to preserve alignment precision in spite of bearing wear or differential thermal expansion. As a result, the present invention is particularly advantageous for use in spacecraft applications where a hard preload is desirable during spacecraft launch to withstand the rigors of launch-induced vibrations. It then provides, subsequent to a minimum degree of wear or differential thermal expansion, a preselected minimum soft preload dictated by the characteristics of at least one spring positioned between the bearings and in particular between one of the bearings and an outer sleeve or between two axially disposed outer sleeves. Three different embodiments have been disclosed herein, each very similar to the other except for the manner in which the initial axial position of the shaft and bearing assembly is established. A fourth embodiment disclosed herein has an alternate location for the spring. In a preferred embodiment of the invention disclosed herein, the soft preload configuration is provided by a wave spring positioned in a recess of an outer sleeve adjacent one of the bearings of the bearing set. It will be understood that the precise configuration of this spring may be readily altered and also that the precise number and location of such springs may be readily altered while still accomplishing the objectives of the present invention.

Those having skill in the art to which the present invention pertains will now, as a result of the applicants' teaching herein, perceive various modifications and additions which may be made to the invention. By way of example, the precise shapes and relative dimensions of the bearings and associated components thereof may be readily altered while still preserving the dual preload characteristic of the invention namely, while still providing a hard preload until a minimum degree of wear has been effect at which time a soft preload minimum is established by a compliant member. Accordingly, all such modifications and additions are deemed to be within the scope of the invention which is to be limited only by the claims appended hereto.

We claim:

1. A bearing assembly for maintaining the axial alignment of a rotating shaft; the assembly comprising:
    a first bearing having opposed inner and outer annular races and a plurality of ball members therebetween;
    a second bearing having opposed inner and outer annular races and a plurality of ball members therebetween;
    said first and second bearings being positioned within a housing at axially spaced-apart positions along said shaft, said shaft extending through the inner races of said first and second bearings;
    inner and outer annular sleeves positioned along said shaft between said first and second bearings, said inner sleeve being in contiguous engagement with said shaft and said outer sleeve being spaced radially from said inner sleeve;
    said outer sleeve having at least one annular recess at an end thereof;
    a compliant member positioned in said annular recess for applying a preselected minimum force between said outer race of said second bearing and said outer sleeve; and
    means for clamping said outer race of said first bearing into compressive engagement with said outer sleeve for causing said outer sleeve to engage said outer race of said second bearing with a preselected maximum force initially obviating the effect of said compliant member;
    whereby said force between said outer sleeve and said outer race of said second bearing is initially defined by said maximum force and, upon wear of said bearing assembly, is ultimately defined by said minimum force.

2. The bearing assembly recited in claim 1 wherein said compliant member is a spring.

3. The bearing assembly recited in claim 1 wherein said compliant member is a wave spring.

4. The bearing assembly recited in claim 3 wherein said wave spring is circular and has a center positioned along the axis of said shaft.

5. The bearing assembly recited in claim 1 wherein said clamping means comprises a flange on the outer race of said first bearing, a retainer bearing against said flange and at least one bolt securing said retainer to said housing.

6. The bearing assembly recited in claim 1 wherein said clamping means comprises a retainer bearing against the outer race of said first bearing and at least one bolt securing said retainer of said housing.

7. A bearing assembly comprising a pair of coaxially aligned spaced-apart ball bearing race members; means for initially applying a predetermined maximum preload force between said members; and means having a compliant member for providing a predetermined minimum preload force between said members upon subsequent wear of said members, said maximum preload force being determined by relative clamping of said members and said minimum preload force being determined by said compliant member only after said subsequent wear.

8. The bearing assembly recited in claim 7 further comprising at least one cylindrical sleeve positioned between said members and wherein said maximum preload force applying means comprises means for compressing said members and said sleeve together in contiguous compressing engagement.

9. The bearing assembly recited in claim 8 wherein said sleeve provides an annular recess at one of its axial ends and said compliant member is positioned in said recess.

10. The bearing assembly recited in claim 9 wherein said cylindrical sleeve comprises at least two axially adjacent members and said complaint member is located in an annular recess in at least one of the outer sleeve members at the interface between said two members.

11. The bearing assembly recited in claim 10 wherein said complaint member is a spring.

12. The bearing assembly recited in claim 10 wherein said complaint member is a wave spring.

13. The bearing assembly recited in claim 8 wherein said compliant member is a spring.

14. The bearing assembly recited in claim 8 wherein said compliant member is a wave spring.

15. A bearing assembly for use in a spacecraft; said assembly comprising:

a pair of coaxially aligned spaced-apart ball bearing race members; non-compliant means for applying a predetermined maximum preload force between said members during launching of said spacecraft; and compliant means for providing a predetermined minimum preload force between said members upon subsequent wear or thermal expansion of said members during the orbit life of said spacecraft.

* * * * *